2 Sheets—Sheet 1.

J. S. FARLEY.
Creaming-Can.

No. 221,293. Patented Nov. 4, 1879.

Witnesses
Fred. G. Dietrich
C. F. Peterson

Inventor:
John S. Farley
by Louis Bagger
Attorney

2 Sheets—Sheet 2.
J. S. FARLEY.
Creaming-Can.
No. 221,293. Patented Nov. 4, 1879.
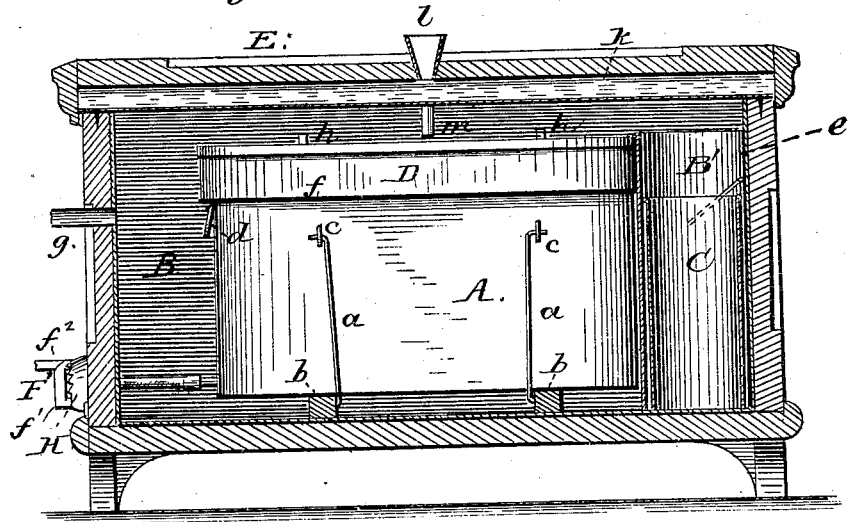
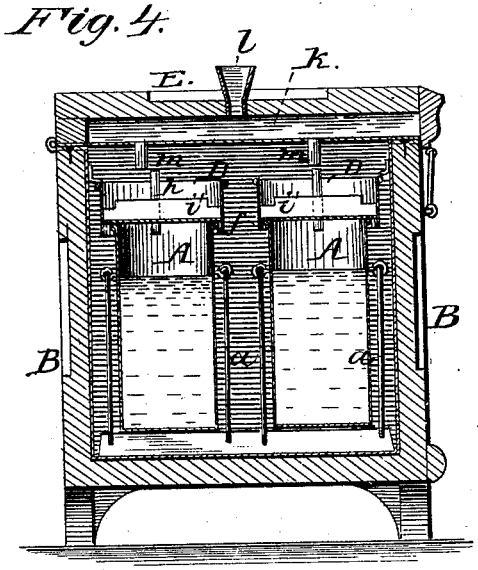
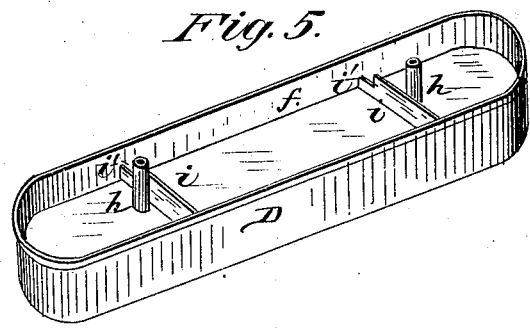
Witnesses
Fred. G. Dieterich
C. F. Petersen.
Inventor
John S. Farley
by Louis Bagger
Attorneys

UNITED STATES PATENT OFFICE.

JOHN S. FARLEY, OF WADDAM'S GROVE, ILLINOIS.

IMPROVEMENT IN CREAMING-CANS.

Specification forming part of Letters Patent No. 221,293, dated November 4, 1879; application filed August 11, 1879.

*To all whom it may concern:*

Be it known that I, JOHN S. FARLEY, of Waddam's Grove, in the county of Stephenson and State of Illinois, have invented certain new and useful Improvements in Creaming-Cans; and I do hereby declare that the following is a full, clear, and exact description of the invention, which will enable others skilled in the art to which it appertains to make and use the same, reference being had to the accompanying drawings, which form a part of this specification, and in which—

Figure 1:
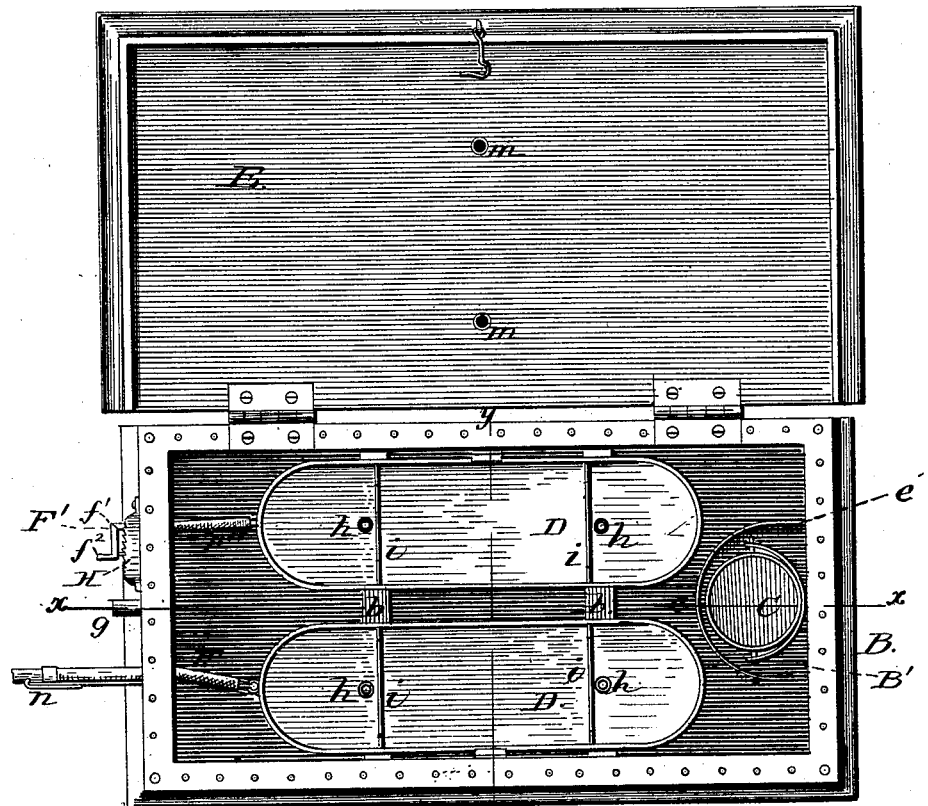
Figure 2:
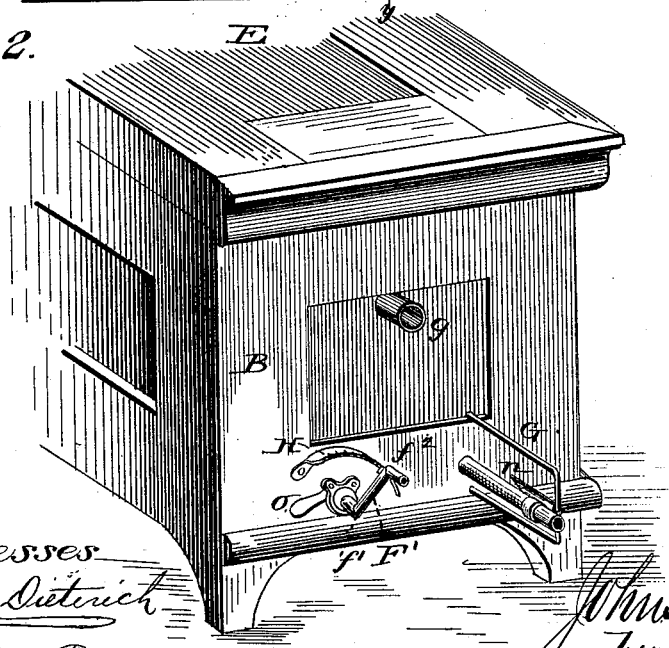

Figure 1 is a plan or top view of a vat and cans embodying my improvement. Fig. 2 is a perspective front view of the vat. Fig. 3 is a longitudinal section on line $x\,x$, Fig. 1. Fig. 4 is a cross-section on line $y\,y$, Fig. 1; and Fig. 5 is a perspective view of one of the can-covers.

Similar letters of reference indicate corresponding parts in all the figures.

This invention relates to creaming-cans or cans for setting and cooling milk, for the purpose of allowing the cream to form, and subsequently separating the milk from the cream; and it consists, essentially, in the combination, with the can or cans for containing the milk, and with a surrounding refrigerating-vat, of one or more adjustable tubes, so arranged that by their adjustment outside of the vat the milk may be drawn off from the cans after the cream has set without disturbing it, substantially as hereinafter more fully described.

In the two sheets of drawings hereto annexed, A A are the cans, which are constructed exactly alike, and may be of any desired size or proportions. These cans are placed alongside of each other within the vat B, resting upon cross-pieces $b\,b$, so as to be elevated a short distance above the bottom of the vat, and are held in place by rods or stanchions $a\,a$, bent at their upper ends to form hooks, which are inserted into eyes $c\,c$, projecting laterally from the sides of the cans. $d\,d$ are bails or handles secured in the ends of the cans, by which these may be lifted out of or replaced within the vat when it is desired to clean them, or for other purposes. In the rear part of the vat or refrigerator B is a partition, $e$, forming a separate compartment, B', for holding the cream-can C.

D D are the can-covers, each of which has a rim or flange, $f$, which overlaps the rim of the can and projects up above the flat part of the cover, so as to form a hollow space or receptacle upon the top of the cover for holding the ice, the water from which will overflow the edge of the cover as the ice gradually melts and run down along the sides of the can into the vat, which is provided with an overflow-pipe, $g$, arranged at a suitable height to permit the cans to be constantly immersed in the cold water. $h\,h$ are air-tubes inserted vertically into the covers D D, and extending a little above the upper edge of flange $f$, to prevent the water in the top of the cover from entering the can. $i\,i$ are transverse braces, made of sheet metal, for strengthening the cover, which said braces are recessed at their ends, impinging upon flange $f$, as shown at $i'\,i'$, to enable the water to circulate freely upon the top of the cover.

The hinged cover E of the refrigerating-vat B is made hollow to form an air-chamber, $k$, into which is inserted a funnel, $l$, communicating with the outer air. Two pipes, $m\,m$, project from the bottom of chamber $k$ into the recesses formed in the tops of covers D D, so that, if desired, the chamber $k$ may be filled with water through the funnel $l$, which will flow through the pipes $m\,m$ down into the hollow top of the covers. Under ordinary circumstances, however, the pipes $m\,m$, chamber $k$, and funnel $l$ serve the purpose of ventilation only.

In the present illustration of my invention I have shown two different methods of constructing the adjustable tubes through which the milk and cream are drawn off. One of these is simply a flexible tube, F, made of rubber or similar material, which extends from the front end of the bottom of one (or both) of the cans A, passing through a packed opening near the bottom of the vat B. The projecting end of tube F is closed by any suitably-constructed stopper; and, if desired, stoppers or faucets may also be arranged at the point where the flexible tube is connected to the vat. The outer end of tube F is provided with a spring-clamp, $n$, which is adjustable vertically upon a wire bail or bracket, G, which projects from the front end of the vat.

Another form is shown to the left in Fig. 2, which consists of a pipe, F', having two elbows $f'$ $f^2$, pointing in opposite directions, and provided with a cut-off or valve operated by a handle, o. The bent pipe F' is pivoted at its lower elbow, $f'$, in a short piece of tubing inserted through the front wall of the vat, and the other end of which is connected to the creaming-can by a short length of flexible tubing. Back of the upper elbow, $f^2$, of pipe F' is a lip or projection, which engages with notches in a segmental rack, H, secured upon the front end of the vat back of the pivoted discharge-pipe F', so that the angle or elevation of the pipe may be easily adjusted, and when once adjusted retained in its given position.

From the foregoing description, taken in connection with the drawings, the operation of my invention will be readily understood. After the cream has set upon the milk contained in the cans A A, its thickness is ascertained by inserting a graduated glass tube into the milk, and the outer ends of the adjustable tubes F F' are adjusted so that their outlets shall be at a corresponding elevation above the bottom of their respective cans. On removing the stoppers or opening the valves, it follows that the milk will be drawn off from under the cream, which will be left in the bottom of the can, and may be drawn off subsequently by lowering the outlets of the discharge-pipes.

Having thus described my invention, I claim and desire to secure by Letters Patent of the United States—

1. The combination, in an apparatus for setting milk for cream, of the refrigerating-vat B, provided on its front face with the segmental rack H, milk-can A, provided at or near its bottom with a tube penetrating the front wall or face of vat B, and pivoted discharge-pipe F', constructed with the elbows $f'$ $f^2$, and adjustable in the rack H, substantially as and for the purpose herein shown and specified.

2. The combination of the refrigerating-vat B, the hinged cover E, of which is provided with the air-chamber $k$, funnel $l$, and pipes $m$ $m$, and cans A A, provided with the recessed covers D D, which receive the pipes $m$ $m$, substantially as and for the purpose herein shown and described.

In testimony that I claim the foregoing as my own I have hereto affixed my signature in presence of two witnesses.

JOHN SIDNEY FARLEY.

Witnesses:
 DAVID S. FARLEY,
 WALTER STICKNEY.